(12) United States Patent
Pratt

(10) Patent No.: US 8,066,813 B2
(45) Date of Patent: Nov. 29, 2011

(54) CEMENTITIOUS COMPOSITIONS CONTAINING FELDSPAR AND POZZOLANIC PARTICULATE MATERIAL, AND METHOD OF MAKING SAID COMPOSITION

(75) Inventor: Allen Pratt, London (CA)

(73) Assignee: Her Majesty the Queen in right of Canada, as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 12/919,856

(22) PCT Filed: Feb. 24, 2009

(86) PCT No.: PCT/CA2009/000216
§ 371 (c)(1),
(2), (4) Date: Nov. 8, 2010

(87) PCT Pub. No.: WO2009/105872
PCT Pub. Date: Sep. 3, 2009

(65) Prior Publication Data
US 2011/0048286 A1 Mar. 3, 2011

(30) Foreign Application Priority Data
Feb. 29, 2008 (CA) ..................... 2623132

(51) Int. Cl.
*C04B 28/08* (2006.01)
*B28C 5/00* (2006.01)

(52) U.S. Cl. ........ 106/710; 106/705; 106/706; 106/712; 106/782; 106/788; 106/790; 106/791; 106/792; 106/793; 106/817

(58) Field of Classification Search .................. 106/705, 106/706, 710, 772, 782, 788, 790, 791, 817, 106/792, 793
See application file for complete search history.

(56) References Cited

U.S. PATENT DOCUMENTS

| 4,756,761 | A | 7/1988 | Philip et al. |
| 5,366,548 | A | 11/1994 | Riddle |
| 5,374,307 | A | 12/1994 | Riddle |
| 5,379,840 | A | 1/1995 | Cowan et al. |
| 5,565,028 | A | 10/1996 | Roy et al. |
| 6,033,467 | A | 3/2000 | Krofchak |
| 6,406,535 | B1 * | 6/2002 | Shintome ..................... 106/705 |
| 7,691,198 | B2 * | 4/2010 | Van Deventer et al. ....... 106/600 |

FOREIGN PATENT DOCUMENTS

| CA | 2131906 | 10/1992 |
| EP | 0393043 B1 | 5/1992 |
| JP | 02302346 A2 | 12/1990 |
| KR | 20040107599 | 12/2004 |
| WO | 02070423 A1 | 9/2002 |
| WO | WO2007/109862 A1 * | 10/2007 |

OTHER PUBLICATIONS

Atkinson et al., "Using Smelter Slag in Mine Backfill," Mining Magazine, 1989, vol. 160, No. 8, pp. 118-123.

* cited by examiner

*Primary Examiner* — Anthony Green
(74) *Attorney, Agent, or Firm* — Price Heneveld LLP

(57) ABSTRACT

A method of making a cementitious composition comprises (a) selecting at least one pozzolanic particulate material; (b) selecting and grinding at least one feldspar material to a fineness of at least 3000 Blaine; (c) mixing calcium oxide or calcium hydroxide with gypsum; (d) mixing the ground feldspar with the lime-gypsum mixture to produce an activator; (e) conditioning the pozzolanic particulate material with an aqueous solution; (f) adding the activator to the conditioned material to produce a slurry; and (g) curing the slurry in a sealed container. The pozzolanic particulate material can be slag, fly ash, or siliceous rock. A cementitious composition of the invention comprises a pozzolanic particulate material, a ground feldspar material, a lime compound and gypsum, and uses readily available materials, as an economic replacement for Portland cement, fly ash or other materials in filling, backfilling and paving, particularly for backfilling or stabilizing mine sites.

30 Claims, No Drawings

CEMENTITIOUS COMPOSITIONS CONTAINING FELDSPAR AND POZZOLANIC PARTICULATE MATERIAL, AND METHOD OF MAKING SAID COMPOSITION

FIELD OF INVENTION

The present invention relates to cementitious compositions and methods of making such compositions from particulate materials activated by a feldspar material, the feldspar material replacing the use of Portland cement or other materials. The compositions can be used to produce fill and backfill material for various engineering purposes, including underground mine workings, stabilization or solidification of mine wastes, and general land stabilization and paving applications.

BACKGROUND

Cementitious compositions are used for filling, backfilling and stabilization in a large variety of situations. In particular, at mining sites, for safety and other reasons, it is frequently necessary to conduct backfilling operations, or to stabilize or solidify mine wastes at the surface. Conventionally, Portland cement is used for this purpose; however, having regard to the high cost of this material, and of shipping it to the intended use site, this represents a major cost in mining operations throughout the world, and in Canada in particular. Any reduction in the amount of Portland cement required would lower the operating costs of a mine and contribute to the profitability of the mining operation. Similarly, in other filling and backfilling operations, any reduction in the use of Portland cement and its replacement by more readily available or cheaper materials would provide an immediate economic benefit for the subject operation.

In the context of mining operations, one material that has recently been considered as having the potential for reducing the amount of Portland cement used is slag, and in particular non-ferrous granulated slag, which is a readily available waste product of the smelting of copper and nickel concentrates. However, in order to use any material to replace Portland cement, it is necessary that the cementing (pozzolanic) properties be substantially equivalent to those of Portland cement. Although many forms of slag contain suitable constituents, it is difficult to activate the cementing properties of the slag.

Activation of the pozzolanic properties of a non-ferrous granulated slag requires the addition of cementing supplements as an activator, to provide the calcium, sulphur and aluminum needed to grow the cementitious mineral ettringite. Ettringite has the composition $Ca_6Al_2(SO_4)_3(OH)_{12} \times 26H_2O$ and is the first binder to form in a cement. To form ettringite, conventionally calcium is supplied by quick lime, sulphur by gypsum and aluminum by supplements such as fly ash and a calcium aluminate slag obtained from the recycling of spent catalysts.

Currently, using conventional methods, there are three approaches to activating non-ferrous granulated slag. The first method is to add the cementing supplements at the smelter just prior to granulation, as disclosed by Philip et al. in U.S. Pat. No. 4,756,761 and R. J. Atkinson et al. (1989, Using Smelter Slag in Mine Backfill, *Mining Magazine*, Vol. 160, No. 8, pp. 118-123). The second method is to blend the non-ferrous granulated slag with Portland cement as disclosed by Krofchak in U.S. Pat. No. 6,033,467; however, this method suffers from the disadvantage noted above, associated with the use of Portland cement as the activator. The third method is to add one or more cementing supplement during mixing with the aggregate material.

For the third method, it is known to use a composition containing fly ash waste as its main ingredient. Fly ash waste is available as a by-product from the combustion of coal in thermal power plants. However there are a number of drawbacks to using fly ash as an activator, including issues of quality, transportation and availability. The pozzolanic properties of fly ash vary according to the type of coal from which it was created, which creates a serious problem of inconsistency and unreliability of performance. In some instances, the fly ash does not provide sufficient amounts of aluminum for ettringite nucleation and growth. Fly ash is not locally available at most of the non-ferrous smelters and mining operations, particularly in Canada, so for such applications it must be shipped at considerable expense.

It is also known to use calcium aluminate to supply aluminum for ettringite nucleation and growth. However, there are very limited sources for the compound, and transportation costs of shipping it to the intended use site may be prohibitively high, or at least significantly increase operating costs.

Therefore, what is needed is a novel, readily available and affordable activator for activating pozzolanic materials, such as slag, to form cementitious compositions which can be used to replace Portland cement in filling and backfilling operations, in particular for backfilling of underground mine workings and the stabilization and solidification of mine wastes, and which compositions do not suffer from the disadvantages of the known compositions, including those noted above.

It has now been found that feldspar materials can be used as an effective and affordable activator of many types of pozzolanic materials, preferably particulate materials, and including especially slag materials, either ferrous or non-ferrous, and in granulated or other form; and further including fly ash having minimal self-cementing properties, and siliceous rocks.

SUMMARY OF THE INVENTION

The invention seeks to provide a cementitious composition and a method of making the composition from a pozzolanic material activated by a feldspar, wherein the pozzolanic material replaces the use of Portland cement, to provide a composition suitable for filling and backfilling operations, such as for backfilling of underground mine workings and the stabilization/solidification of mine wastes.

Feldspars are a group of rock-forming minerals which make up a large proportion of the Earth's crust. Feldspars are made up of two principal mineral series, the alkali feldspars and the plagioclase feldspars. The distinction between the alkali and plagioclase feldspars is complicated by the phenomena of solid solution. The alkali feldspars are monoclinic or triclinic crystals that have more potassium than calcium. The plagioclase feldspars are triclinic with less potassium than calcium or sodium. Plagioclase feldspars are made up of a continuous series of sodium-aluminum and calcium-aluminum silicates.

The sodium endmember in plagioclase feldspars is albite and the calcium endmember is anorthite. The intervening members are oligoclase, andesine, labradorite, and bytownite. The most commonly occurring members are albite, and labradorite. Plagioclase feldspars are found in virtually all of the igneous and metamorphic rocks that are associated with copper-nickel mining/smelting operations in Canada, and elsewhere in the world. Alkali feldspars are dominated by the orthoclase mineral series and the microcline mineral series. The orthoclase series has monoclinic crystals and the microcline series has triclinic crystals. Alkali feldspars are very common minerals and are found in the country rocks such as granite or pegmatites in or near mining/smelting operations in Canada and elsewhere in the world.

The plagioclase and alkaline feldspars are a good source of silicon and the aluminum needed for ettringite nucleation and growth. The use of calcium compounds, such as calcium oxide, increases the pH of the feldspar to the alkalinity level required for activating the feldspar's aluminum content.

The use of feldspars to activate pozzolanic materials has a number of advantages over current methods of activation, in particular in relation to intended end uses for mining operations. Plagioclase feldspars are readily available for many uses, in that they naturally occur in widespread locations. In particular, their occurrence in close vicinity to mining and smelting operations avoids the need for expensive and time consuming long distance transport to a mine site. Additionally, feldspars do not have the known disadvantages of Portland cement (expense) or fly ash (variable constituents and variable pozzolanic properties, unreliable supply, transport costs).

It has been found that the use of feldspars, including alkali feldspars, in particular microcline, and each of the plagioclase feldspars, as pozzolanic activators provides results which are consistent and improved over the use of fly ash, with the added advantages that these materials are readily available, generally in close proximity to the intended use site, and are significantly more economical than the known materials, and at the same time provide direct and indirect environmental benefits.

It has further been found that these feldspars are effective to activate the pozzolanic properties of a wide range of materials. As noted above, these include ferrous and non-ferrous slag, in particulate form, prepared by granulation or air-cooling. Other materials which can be activated by the selected feldspars include those types of fly ash which have minimal or no self-cementing properties; and siliceous rocks, particularly those containing at least one of calcium, magnesium, sodium and aluminum, most particularly the mafic rocks.

According to a first broad aspect, the invention seeks to provide a method of making a cementitious composition comprising the steps of:
(a) selecting at least one pozzolanic particulate material;
(b) selecting at least one feldspar material and grinding it to a fineness of at least 3000 Blaine;
(c) mixing a lime compound selected from calcium oxide and calcium hydroxide, and gypsum;
(d) mixing the ground material of step (b) with the mixture of step (c) to produce an activator mixture;
(e) conditioning the pozzolanic particulate material of step (a) by mixing in gradual additions of an aqueous solution;
(f) adding the activator of step (d) to the conditioned product of step (e) and stirring the mixture to produce a slurry; and
(g) curing the slurry of step (f) in a sealed container.

The pozzolanic particulate material can be selected from at least one slag material, at least one siliceous rock, fly ash, and combinations thereof. Where a slag material is used, it is preferably ground to a fineness of at least 3000 Blaine, more preferably 3400 Blaine, and can comprise at least one granulated slag material, at least one non-granulated slag material resulting from an air cooling process, or combinations of granulated and non-granulated materials.

Similarly, if the pozzolanic particulate material is siliceous rock, it is preferably ground to a fineness of at least 3000 Blaine, more preferably 3400 Blaine. Such rock material preferably comprises at least one of calcium, magnesium, sodium and aluminum, and more preferably in an amount of at least 2% by weight of such minerals.

Preferably, the aqueous solution is a lime saturated solution, and if a slag material is used, it can be non-ferrous or ferrous.

The feldspar material can be at least one of a plagioclase feldspar and an alkali feldspar, or combinations; preferably, the plagioclase feldspar is selected from albite, oligoclase, andesine, labradorite, anorthite and combinations thereof, and the alkali feldspar is preferably microcline.

Preferably the conditioning is performed over a period of between five minutes and twenty-four hours, and the aqueous solution is added over a period of between five minutes and twenty-four hours at a temperature of at least 10° C., preferably in a range between 10° C. and 100° C., more preferably 10° C. and 50° C.

Preferably, the step of adding the activator is performed over a period of between five minutes and six hours at a temperature of at least 10° C., preferably in a range between 10° C. and 100° C., more preferably 10° C. and 50° C.

Preferably, the step of curing the slurry is performed over a period of at least 28 days.

According to a second broad aspect, the invention seeks to provide a cementitious composition comprising a pozzolanic particulate material, a ground feldspar material, a lime compound selected from calcium oxide and calcium hydroxide, and gypsum.

Corresponding with the method of the invention as discussed above, the pozzolanic particulate material for the composition can be selected from at least one slag material, at least one siliceous rock, fly ash, and combinations thereof. Where a slag material is used, it is preferably ground to a fineness of at least 3000 Blaine, more preferably 3400 Blaine, and can comprise at least one granulated slag material, at least one non-granulated slag material resulting from an air cooling process, or combinations of granulated and non-granulated materials. If fly ash is used, it can be activated without first being ground.

Similarly, if the pozzolanic particulate material is siliceous rock, it is preferably ground to a fineness of at least 3000 Blaine, more preferably 3400 Blaine. Such rock material preferably comprises at least one of calcium, magnesium, sodium and aluminum, and more preferably in an amount of at least 2% by weight of such minerals.

Preferably, the cementitious composition further comprises an aqueous solution; more preferably, the aqueous solution is a lime saturated solution. If a slag material is used, it can be non-ferrous or ferrous, and can comprise at least one granulated slag material, at least one non-granulated slag material resulting from an air cooling process, or combinations of granulated and non-granulated materials.

The feldspar material can be at least one of a plagioclase feldspar and an alkali feldspar, or combinations; preferably, the plagioclase feldspar is selected from albite, oligoclase, andesine, labradorite, anorthite and combinations thereof, and the alkali feldspar is preferably microcline.

According to a third broad aspect, the invention seeks to provide a cementitious composition prepared by the method of the invention.

DETAILED DESCRIPTION OF THE INVENTION

A method of making a cementitious composition from a pozzolanic particulate material activated by a feldspar comprises the following steps.

First, a suitable available pozzolanic particulate material is selected, and prepared if necessary to achieve a fineness of at least 3000 Blaine. In the case of slag materials or siliceous rock materials, these are ground to the required fineness; fly ash can generally be used without being ground or otherwise prepared. As noted above, where a slag material is used, it can be granulated or non-granulated, for example resulting from an air cooling process, or combinations of granulated and non-granulated materials. The slag material may be a non-ferrous slag material or at least one ferrous slag material.

At least one feldspar material is then selected and ground to a fineness of at least 3000 Blaine. The feldspar material is preferably at least one of a plagioclase feldspar and an alkali feldspar. The plagioclase feldspar is preferably albite, oligoclase, andesine, labradorite, anorthite and combinations thereof. The alkalki feldspar is preferably microcline.

The activator mixture is prepared by mixing calcium oxide or calcium hydroxide, preferably calcium oxide, together with gypsum, and mixing in the ground feldspar; in this activator mixture, the calcium oxide or calcium hydroxide provides the calcium and the gypsum provides the sulphur needed, with the aluminum from the ground feldspar, for ettringite nucleation and growth.

The ground slag material is then conditioned by gradual additions of an aqueous solution. It has been found that a lime saturated solution is particularly effective for the aqueous solution. The conditioning is preferably performed over a period of between five minutes and twenty-four hours, the aqueous solution being added over a period of between four and twenty-four hours at a temperature of at least 10° C., preferably in a range between 10° C. and 100° C., more preferably 10° C. and 50° C.

The activator mixture is then added to the conditioned ground material and the ensuing mixture is stirred to produce a slurry. This step is preferably performed over a period of between five minutes and six hours at a temperature of at least 10° C., preferably in a range between 10° C. and 100° C., more preferably 10° C. and 50° C. Thereafter, the slurry can be cured by known methods, and thereafter can be subjected to testing by known methods, and utilized for its intended end use, for filling, backfilling, paving or similar purposes, including backfilling at a mine site, or in stabilizing or solidifying mine wastes, in the same manner as the cementitious materials of the prior art.

The invention claimed is:

1. A method of making a cementitious composition comprising the steps of:
   (a) selecting at least one pozzolanic particulate material from at least one slag material, at least one siliceous rock, fly ash, and combinations thereof;
   (b) selecting at least one feldspar material and grinding it to a fineness of at least 3000 Blaine;
   (c) mixing a lime compound selected from calcium oxide and calcium hydroxide with gypsum;
   (d) mixing the ground material of step (b) with the mixture of step (c) to produce an activator mixture;
   (e) conditioning the pozzolanic particulate material of step (a) by mixing in gradual additions of an aqueous solution to produce a conditioned product;
   (f) adding the activator of step (d) to the conditioned product of step (e) and stirring the mixture to produce a slurry; and
   (g) curing the slurry of step (f) in a sealed container.

2. A method of making a cementitious composition according to claim 1, wherein the at least one pozzolanic particulate material comprises at least one slag material, and step (a) further comprises grinding the at least one slag material to a fineness of at least 3000 Blaine.

3. A method of making a cementitious composition according to claim 1, wherein the at least one pozzolanic particulate material comprises at least one siliceous rock, and step (a) further comprises grinding the at least one siliceous rock to a fineness of at least 3000 Blaine.

4. A method of making a cementitious composition according to claim 1, wherein the at least one slag material is selected from at least one granulated slag material, at least one slag material resulting from an air cooling process and combinations thereof.

5. A method of making a cementitious composition according to claim 1, wherein the at least one siliceous rock comprises at least one of calcium, magnesium, sodium and aluminum.

6. A method of making a cementitious composition according to claim 5, wherein the at least one siliceous rock comprises at least 2% by weight of at least one of calcium, magnesium, sodium and aluminum.

7. A method of making a cementitious composition according to claim 1, wherein the aqueous solution is a lime saturated solution.

8. A method of making a cementitious composition according to claim 1, wherein the selecting in step (b) comprises selecting at least one of a plagioclase feldspar and an alkali feldspar.

9. A method of making a cementitious composition according to claim 8, wherein the selecting in step (b) comprises selecting at least one plagioclase feldspar material from albite, oligoclase, andesine, labradorite, anorthite and combinations thereof.

10. A method of making a cementitious composition according to claim 8, wherein the alkali feldspar is microcline.

11. A method of making a cementitious composition according to claim 1, wherein the at least one slag material is a non-ferrous slag material.

12. A method of making a cementitious composition according to claim 1, wherein the at least one slag material is a ferrous slag material.

13. A method of making a cementitious composition according to claim 1, wherein the conditioning of step (e) is performed over a period of between five minutes and twenty-four hours, and the aqueous solution is a lime saturated solution and is added over a period of between four and twenty-four hours at a temperature of at least 10° C.

14. A method of making a cementitious composition according to claim 13, wherein the lime saturated solution is added at a temperature in a range between 10° C. and 100° C.

15. A method of making a cementitious composition according to claim 14, wherein the lime saturated solution is added at a temperature in a range between 10° C. and 50° C.

16. A method of making a cementitious composition according to claim 1, wherein step (f) is performed over a period of between five minutes and six hours at a temperature of at least 10° C.

17. A method of making a cementitious composition according to claim 16, wherein step-(f) is performed at a temperature in a range between 10° C. and 100° C.

18. A method of making a cementitious composition according to claim 17, wherein step (f) is performed at a temperature in a range between 10° C. and 50° C.

19. A method of making a cementitious composition according to claim 1, wherein step (g) is performed over a period of at least 28 days.

20. A cementitious composition comprising at least one pozzolanic particulate material selected from at least one slag material, at least one siliceous rock, fly ash, and combinations thereof, together with a ground feldspar material, a lime compound selected from calcium oxide and calcium hydroxide, gypsum, and an aqueous solution comprising a lime saturated solution.

21. A cementitious composition according to claim 20, wherein the at least one pozzolanic particulate material comprises at least one slag material ground to a fineness of at least 3000 Blaine.

22. A cementitious composition according to claim 20, wherein the at least one pozzolanic particulate material comprises at least one siliceous rock ground to a fineness of at least 3000 Blaine.

23. A cementitious composition according to claim 22, wherein the at least one siliceous rock comprises at least one of calcium, magnesium, sodium and aluminum.

24. A cementitious composition according to claim 23, wherein the at least one siliceous rock comprises at least 2% by weight of at least one of calcium, magnesium, sodium and aluminum.

25. A cementitious composition according to claim 21, wherein the ground slag material is selected from the group consisting of at least one granulated slag, at least one slag material resulting from an air cooling process, and combinations thereof.

26. A cementitious composition according to claim 20, wherein the ground feldspar material is selected from the group consisting of at least one of a plagioclase feldspar and an alkali feldspar.

27. A cementitious composition according to claim 26, wherein the plagioclase feldspar is selected from the group consisting of albite, oligoclase, andesine, labradorite, anorthite and combinations thereof.

28. A cementitious composition according to claim 26, wherein the alkali feldspar is microcline.

29. A cementitious composition according to claim 21, wherein the ground slag material is a non-ferrous slag material.

30. A cementitious composition according to claim 21, wherein the ground slag material is a ferrous slag material.

* * * * *